UNITED STATES PATENT OFFICE 2,191,629

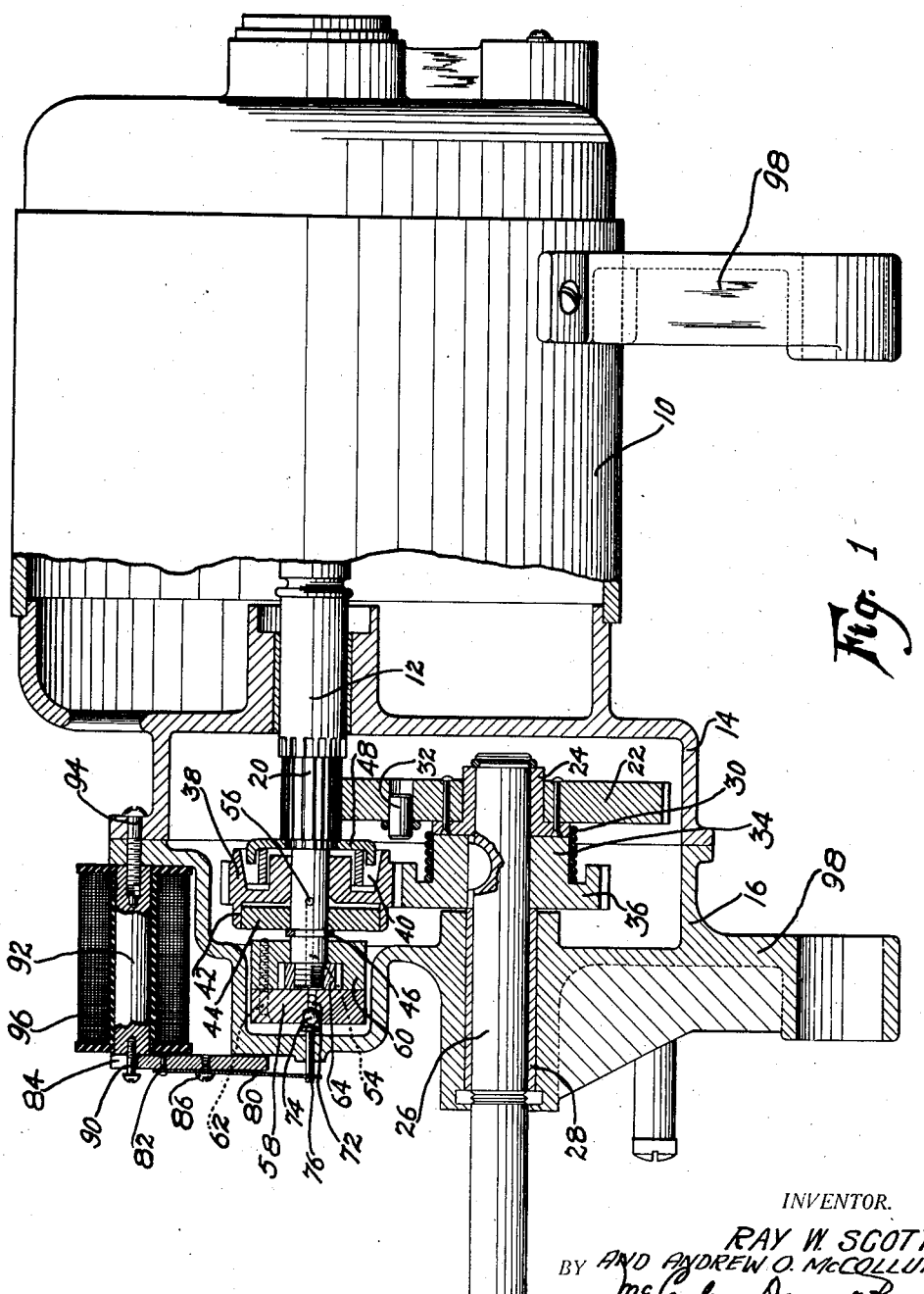

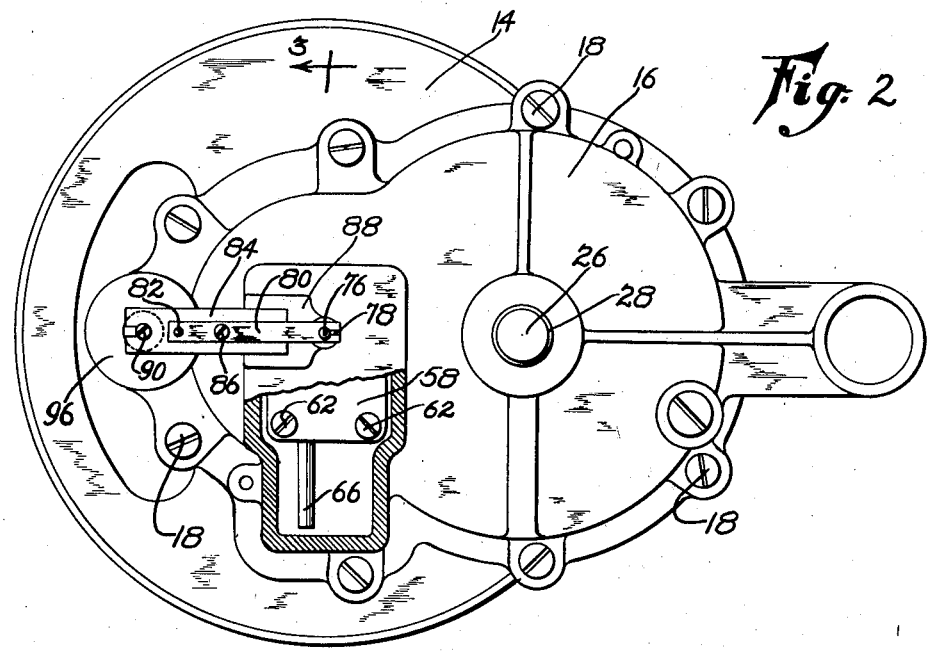
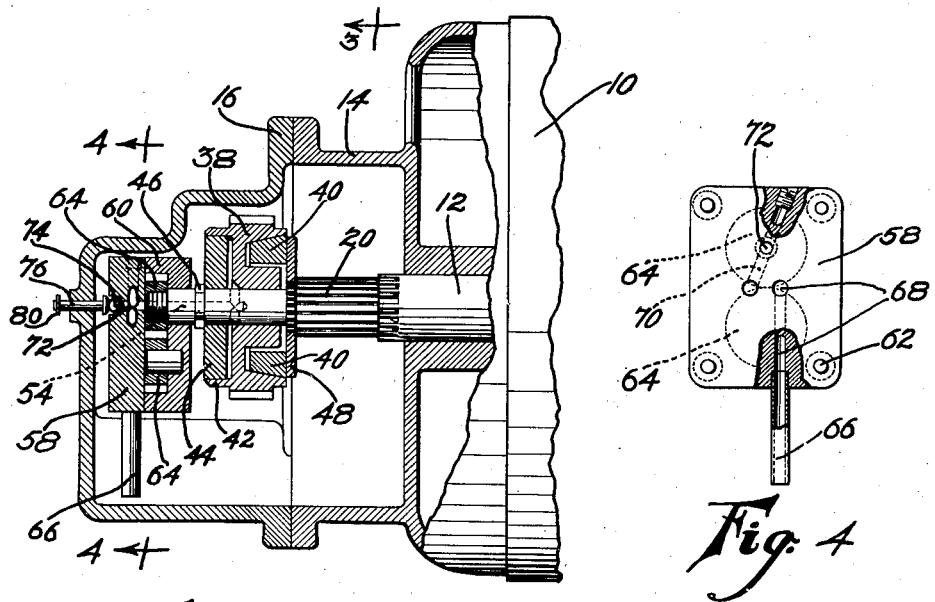

TRANSMISSION

Ray W. Scott and Andrew O. McCollum, Detroit, Mich., assignors to Bendix Home Appliances, Inc., Detroit, Mich., a corporation of Delaware Application October 4, 1937, Serial No. 167,235

13 Claims. (Cl. 74—368)

This invention relates to transmissions or the like, and is illustrated as embodied in a two-speed transmission for an automatic washing machine.

An object of the invention is to provide very sensitive means for changing speed, so that the speed may be controlled by a device which has a small range of movement and which requires relatively little power for its operation. Preferably this is accomplished by arranging the speed-controlling means, instead of directly actuating a clutch or the like to cause the speed change, to control a power device to operate the clutch or its equivalent.

In the preferred embodiments herein described, the power device is actuated by fluid power, and the operating fluid may most conveniently be the lubricant used in the transmission. I prefer to arrange the actuating parts of the device, and a pump or the like supplying the fluid under pressure, in a compact unit with a speed-changing clutch, in a compact unit which is shown as mounted on one of the transmission shafts.

Various features of the invention relate to the construction and the mounting of this unit. These features, and various advantages of the invention, will be apparent from the following description of the illustrative embodiments shown in the accompanying drawings, in which:

Figure 1 is a top plan view of a motor-transmission unit adapted for use in a washing machine, partly broken away in a horizontal plane through the driving and driven shafts of the transmission;

Figure 2 is an end elevation, looking upwardly in Figure 1, the transmission casing being broken away to show the pump unit inside the transmission;

Figure 3 is a side elevation, partly broken away on the line 3—3 of Figure 2;

Figure 4 is an end elevation of one part of the pump casing, looking in the direction of the arrows 4—4 in Figure 3, and partly broken away to show some of the passages formed therein;

Figure 5:
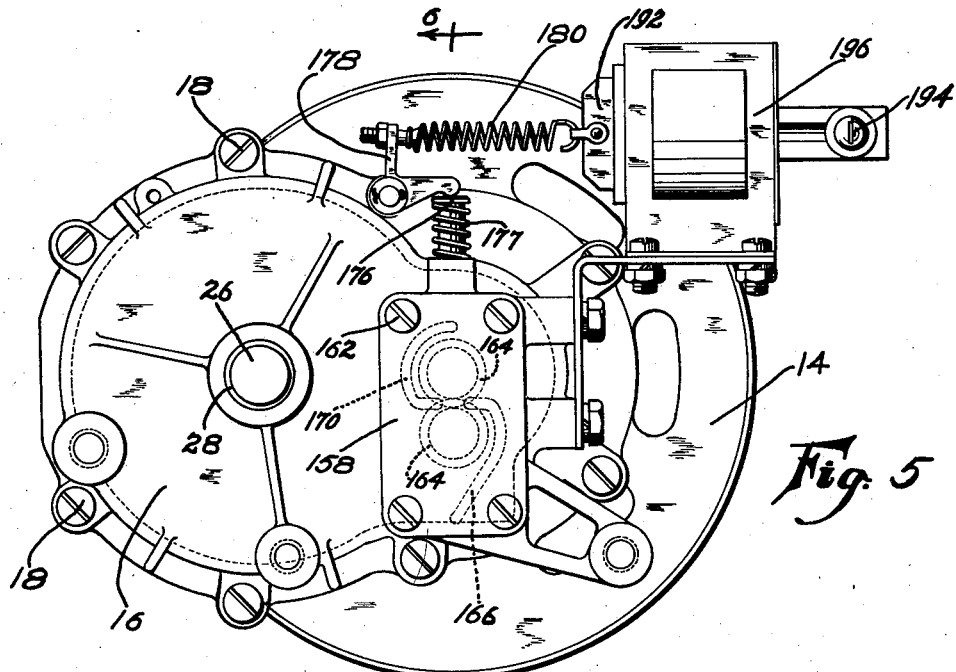
Figure 5 is an end elevation of a second embodiment.

Both embodiments include a motor 10 having an armature shaft 12 which forms the driving shaft of the transmission, and which extends into a transmission casing one part 14 of which is integral with the end of the motor housing, and the other part 16 of which is secured thereto by suitable fastenings 18.

The transmission is shown as including a driving pinion 20 (shown cut integrally on the shaft 12) meshing with a large gear 22 having a hub 24 loosely sleeved on a driven shaft 26 journaled in a bearing 28 in the casing part 16 and extending out of the casing on the side opposite the motor 10. The two shafts 12 and 26 are parallel to each other.

The gear 22 is drivably connected to shaft 26 by a one-way clutch, shown as including a wrapping clutch spring 30 connected at one end to a pin 32 carried by the gear 22, and wound helically around the hub 24 and around a cylindrical boss 34 of the same diameter which is formed on one face of a smaller gear 36 keyed to the shaft 26. By this arrangement, the drive at low speed is from pinion 20 to gear 22, through spring 30 to the gear 36, thus driving the shaft 26. At high speed, when the shaft 26 and the gear 36 are turning faster than the gear 22, the coils of the clutch spring 30 open slightly and allow the shaft 26 to over-run the gear 22, although gear 22 continues to be driven by the pinion 20.

The gear 36 meshes with a driving gear 38 movably mounted on the driving shaft 12, the shaft preferably having for this purpose a smooth small-diameter portion beyond the teeth of the pinion 20. The present invention relates to the means for selectively clutching the gear 38 to the shaft 12 and unclutching it therefrom, or in some equivalent manner operating a clutch or the like to give high speed.

In both embodiments, in order to secure the most compact arrangement possible, I prefer to form the gear 38 on one face with an annular recess having a conical clutch surface engageable with corresponding conical surfaces on clutch shoes 40 of suitable friction material, and to form it integrally on the other face with a cylinder 42 containing a piston 44 mounted on the shaft 12 and held against movement axially of the shaft by means such as a C shaped washer 46 seated in a groove in the shaft.

In the embodiment of Figures 1-4, the clutch shoes 40 have projecting between them drive lugs formed on a stamped clutch element or plate 48 keyed to the shaft 12 by having a serrated central opening embracing the reduced ends of the teeth of the pinion 20.

Figure 6:
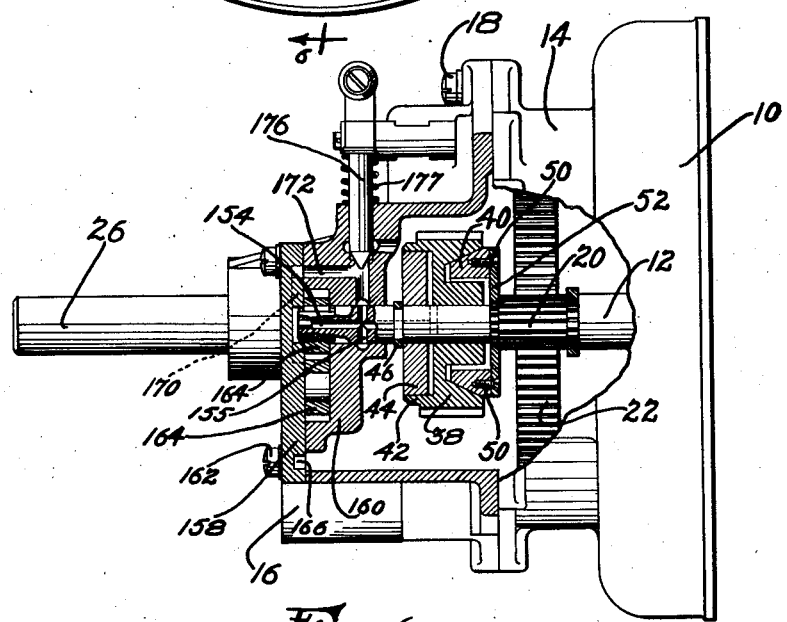
Figure 6 is a side elevation of the second embodiment, partly broken away on the line 6—6 of Figure 5.

In the embodiment of Figures 5 and 6 the shoes 40 are attached by fastenings 50 to a clutch element or plate 52 keyed to the shaft 12 in the same manner.

Reducing the height of the teeth of pinion 20 provides shoulders on the ends of the teeth which back up the plates 48 and 52 and hold them against movement axially of the shaft.

The above-described clutch is also described and is claimed in application No. 144,998, filed May 27, 1937, by myself jointly with Andrew O. McCollum. While other forms of clutches can be used in carrying out the present invention, this particular clutch is advantageous in that it is operable by merely shifting the gear 38 axially along the shaft 12, and the present invention provides for doing this by the relatively simple expedient of supplying fluid under pressure to the cylinder 42.

In the embodiment of Figures 1-4, the shaft 12 has a passage 54 drilled axially from its end, and communicating by cross passages 56 with the cylinder 42 to supply thereto the fluid under pressure. At the end of the shaft is arranged a power device such as a pump having a pump casing in two parts 58 and 60 separably connected by fastenings 62.

Part 60 of the casing is formed with an opening sleeved on the shaft 12 adjacent the washer 46, so that the entire pump is carried by the shaft. The pump casing is rectangular in outline, and is arranged in a similarly shaped recess formed in the transmission casing part 16, and is thereby held against turning with the shaft 12.

Part 60 of the casing is formed with a recess closely encircling intermeshing gears 64, forming a gear pump. The upper gear 64 is threaded on the end of the shaft 12, the direction of the threads being such that driving the pump tends to tighten the joint. The positions of the gears 64 are indicated in Figure 4 by dotted lines, although the gears themselves do not show in that figure.

Part 58 of the casing carries an intake tube 66 dipping into the lubricant in the bottom of the transmission casing, and communicating by passages 68 (formed in casing part 58) with the intake side of the pump gears 64. The outlet side of the pump gears 64 communicate by a space or passages 70 (shown formed in the casing part 58) with a passage 72 which (see Figure 3) communicates at one end with the passage 54 in the shaft 12 and at its other end overflows freely into the transmission casing unless blocked by seating a valve ball 74.

The valve ball 74 is controlled by a plunger 76 movable through the end wall of the transmission casing in alinement with the shaft 12. The end of the plunger 76 is grooved to interlock with a slot 78 in a leaf spring 80.

The leaf spring 80 is secured at one end by a fastening 82 to an iron armature 84, and is bowed away from the armature so that its position may readily be adjusted by tightening or loosening an adjusting screw 86. The end of the armature 84 is received in a recess in a boss 88 (Figure 2) formed on the transmission casing part 16.

The other end of the armature 84 is slotted, and loosely embraces a positioning screw 90 in the end of the iron core 92 secured to the transmission casing by a fastening 94. The core 92 supports a coil 96, the whole forming an electromagnet which when energized acts yieldingly through spring 80 to block the outlet of the pump and build up pressure in the cylinder 42.

The above-described electro-magnetic control device may be operated as described in application No. 129,429, filed March 6, 1937, by John W. Chamberlin and Rex Earl Bassett Jr. and the transmission-motor unit may be provided with supporting arms 98 so that it can be pivotally mounted in a washing machine as described in application No. 129,412, filed March 6, 1937 by Adiel Y. Dodge.

In the embodiment of Figures 5 and 6, the axial passage 154 in the shaft 12 communicates radially by a cross passage 155 with an encircling groove in the pump casing part 160, and the groove opens into a passage 172 having an outlet or overflow controlled by a plunger 176. The plunger 176 is arranged to be seated, against the resistance of a spring 177, by rocking a bellcrank lever 178 yieldingly connected by a spring 180 to the movable core 192 of a solenoid 196. The solenoid is adjustably mounted on the transmission casing by fastenings 194 passing through elongated slots.

The passage 172 also communicates, by a passage 170, with the outlet side of the pump gears 164, the upper one of which is splined on the end of the shaft 12. The passage 170 is formed in pump casing part 158, which is secured to the casing part 160 (shown as being an integral part of the transmission casing) by fastenings 162. The pump casing part 158 is also formed with an intake passage 166 extending below the level of the lubricant in the transmission.

In the operation of both embodiments, energization of the electro-magnet 96 or of the solenoid 196 operates the plunger 76 or 116 to block the outlet of lubricant from the pump, thereby building up pressure in the cylinder 42 to shift the gear 38 axially to cause engagement of the clutch, giving high speed drive.

While two embodiments have been described in detail, it is not my intention to limit the scope of the invention to those particular embodiments, or otherwise than by the terms of the appended claims.

We claim:

1. In a transmission of the type comprising a casing containing lubricant and within which are arranged driving and driven shafts and gearing interconnecting them and which has two clutches arranged when effective respectively to cause the gearing to drive at high or low speed and one of which over-runs and is ineffective when the other is rendered effective, a pump within the casing directly driven by said driving shaft and acting on lubricant taken from the supply in said casing, means operable from the exterior of the transmission selectively to maintain or to relieve the pressure on the lubricant acted on by the pump and a fluid-power actuator for said other clutch utilizing said lubricant acted on by the pump as its working fluid and engaging and disengaging said other clutch according to whether said pressure is maintained or relieved.

2. A transmission or the like comprising a shaft having loose thereon a gear formed with recesses on its opposite sides, one of said recesses having a conical surface, a clutch member in said one recess having a cooperating conical surface and fixed against rotation on the shaft and held against movement axially of the shaft away from the gear, the other of said recesses forming a cylinder and having arranged therein a piston held against movement axially of the shaft away from the gear, said shaft having formed therein a passage opening into said cylinder recess between the piston and said gear, and a pump having an intake and an outlet and communicating on its outlet side with said passage, and means for blocking the outlet to cause fluid pressure to shift the gear axially along the shaft into clutching engagement with said clutch member.

3. A transmission or the like comprising a shaft having loose thereon a gear formed with recesses on its opposite sides, one of said recesses having a conical surface, a clutch member in said one recess having a cooperating conical surface and fixed against rotation on the shaft and held against movement axially of the shaft away from the gear, the other of said recesses forming a cylinder and having arranged therein a piston held against movement axially of the shaft away from the gear, said shaft having formed therein a passage opening into said cylinder recess between the piston and said gear and extending axially of the shaft to the end of the shaft, a pump housing on the end of the shaft having an intake and an outlet and communicating with said passage, intermeshing gears in the housing forming a pump unit and one of which gears is mounted on said shaft, and means for blocking the outlet from said housing to cause fluid pressure to shift the gear axially along the shaft into clutching engagement with said clutch member.

4. A transmission or the like comprising a casing having in one wall a pocket with straight sides, a shaft in the casing extending at its end into said pocket, a gear on said shaft having a fluid-operated clutch for clutching it to the shaft, a pump casing mounted on the end of the shaft and fitting between said sides and held against turning thereby, and pump means in the casing and driven by the shaft and connected to operate said clutch.

5. A transmission or the like comprising a casing having in one wall a pocket with straight sides, a shaft in the casing extending at its end into said pocket, a gear on said shaft having a clutch for clutching it to the shaft, fluid-power means for engaging the clutch, a pump casing mounted on the end of the shaft and fitting between said sides and held against turning thereby, intermeshing gears in said casing and one of which is mounted on the shaft and cooperating with said casing to form a pump, said casing having an intake for operating fluid on one side of the gears and having on the other side of the gears an outlet and means communicating with the fluid-power means, and means for blocking said outlet to cause the pump pressure to engage the clutch.

6. A transmission or the like comprising a casing, a shaft extending into the casing and having a gear loose thereon, a clutch arranged to clutch the gear to the shaft, a fluid-power operator for said clutch, a pump mounted on and driven by said shaft and having an intake near the bottom of the casing and having an outlet opposite the end of the shaft and communicating on its outlet side with the fluid-power operator, a plunger movable through the wall of the casing to block said outlet, and means for operating the plunger from outside the casing.

7. A transmission or the like comprising a casing, a shaft extending into the casing and having a gear loose thereon, a clutch arranged to clutch the gear to the shaft, a fluid-power operator for said clutch, a pump mounted on and driven by said shaft and having an intake near the bottom of the casing and having an outlet and communicating on its outlet side with the fluid-power operator, a plunger movable through the wall of the casing to block said outlet, and means for operating the plunger from outside the casing, said pump having a casing engaged by parts of the transmission casing and held thereby from turning with the shaft.

8. A transmission or the like comprising a casing containing lubricant, a motor to which the casing is secured and which has a driving shaft extending into the casing, a driven shaft extending out of the opposite side of the casing from the motor, power transmission means within the casing connecting said shafts including a clutch, a hydraulic operator for said clutch, having operatively connected thereto a power device including a pump driven by one of said shafts and having an intake in said lubricant and having a normally-open outlet, a control device extending through the wall of the casing and movable to block said outlet, an electro-magnet mounted on said casing, and an armature for said electro-magnet having a spring connecting it yieldingly to said control device.

9. A transmission or the like comprising a casing, a motor to which the casing is secured and which has a driving shaft extending into the casing, a driven shaft, power transmission means within the casing connecting said shafts and including a clutch, an operator for said clutch having operatively connected thereto a power device having a control device extending through the wall of the casing, an electro-magnetic device mounted adjacent the control device, and a part moved by energization of the electro-magnetic device and having a leaf spring connecting it yieldingly to said control device.

10. A shaft having a clutch element mounted thereon and held against axial movement, a part movable on the shaft and having on one side a second clutch element engageable with the first clutch element to clutch said part to the shaft, said part having on its opposite side a cylinder having arranged therein a piston mounted on the shaft and held against movement axially of the shaft, said shaft having an axial passage extending from its end and opening into said cylinder, a pump casing in two parts detachably secured together and one of which has an opening sleeved on said shaft and the other of which has a passage communicating with the axial passage at the end of the shaft and with an outlet, intermeshing gears in the pump casing forming a gear pump and one of which is fixed on the end of said shaft, said pump casing having an intake leading to one side of the gears and a space on the other side of the gears leading to the passage in said other part of the casing, and control means operable to block or open said outlet.

11. A shaft having a clutch element mounted thereon and held against axial movement, a part movable on the shaft and having on one side a second clutch element engageable with the first clutch element to clutch said part to the shaft, said part having on its opposite side a cylinder having arranged therein a piston mounted on the shaft and held against movement axially of the shaft, said shaft having an axial passage extending from its end and opening into said cylinder, and a pump driven by said shaft and having its output side communicating with said passage and with an outlet, and means for controlling said outlet.

12. A transmission or the like comprising a casing, a shaft extending into the casing and having a gear loose thereon, a clutch arranged to clutch the gear to the shaft, a fluid-power operator for said clutch, a pump mounted on and driven by said shaft and having an intake near the bottom of the casing and having an outlet and communicating on its outlet side with the fluid-power operator, a plunger movable through the wall of the casing to block said outlet, and means for operating the plunger from outside the casing, said pump having a casing one part of which is integral with the transmission casing.

13. In a transmission of the type comprising driving and driven shafts interconnected by gearing having two clutches giving respectively high or low speed and one of which is an over-running clutch, a fluid-power operator for the other clutch, means driven directly by the driving shaft and supplying to said operator fluid under pressure and electrically-controlled means mounted on the exterior of the transmission for controlling the effective pressure of fluid from the driven means to the fluid-power operator to engage and disengage said other clutch.

RAY W. SCOTT.
ANDREW O. McCOLLUM.